United States Patent

[11] 3,607,681

| [72] | Inventors | Victor F. G. Cooke<br>Youngstown;<br>Sung Ki Lee, Niagara, both of N.Y. |
|---|---|---|
| [21] | Appl. No. | 855,027 |
| [22] | Filed | Sept. 3, 1969 |
| [45] | Patented | Sept. 21, 1971 |
| [73] | Assignee | Hooker Chemical Corporation<br>Niagara Falls, N.Y. |

[54] METALLIZATION OF CERAMICS
15 Claims, No Drawings

[52] U.S. Cl............................................... 204/30,
204/20, 117/54
[51] Int. Cl..................................................... C23b 5/64
[50] Field of Search........................................... 204/20, 30,
38 C; 117/54; 161/225; 29/472.9

[56] References Cited
UNITED STATES PATENTS
2,690,402  9/1954  Crehan............................. 204/30 UX

*Primary Examiner*—Howard S. Williams
*Assistant Examiner*—William I. Solomon
*Attorneys*—Peter F. Casella, Donald C. Studley, Richard P. Mueller, James F. Mudd and Edward A. Meilman

ABSTRACT: A method of metallizing ceramics comprises applying to a ceramic substrate, a paste of ingredients comprising phosphorus sesquisulfide, a reducible metal salt and a volatile liquid, and heating the thus-treated substrate to a temperature sufficient to ignite the phosphorus sesquisulfide. The resulting treated surface can be electroless plated and/or electrolytically plated by conventional techniques.

METALLIZATION OF CERAMICS

BACKGROUND OF THE INVENTION

It is known to obtain conductive coatings on ceramics by applying thereto a composition containing silver, a binder and a solvent and thereafter heating the ceramic. At 110–150° C., the solvent evaporates; at 200–300° C., the binder begins to burn off. At about 400° C., the glassy flux begins to soften; and at 450–800° C., the glass flux fuses to the substrate. Another known method is a copper paste technique which involves the screening of a cupric oxide paste, air firing and then finally firing in a controlled reducing atmosphere. Still another method is known as the "active metal" or "active alloy" process and involves the use of titanium, zirconium or certain of their alloys which, in sheet or powdered form, with or without organic binder, are applied to ceramics and fired at moderate temperatures. However, the nature of the firing atmosphere is very important and is usually helium or argon, although dry, pure hydrogen or a vacuum can be employed. A method has now been found whereby the high temperatures and controlled atmospheres of the prior art can be avoided. The metallized ceramic articles are useful in such industries as automotive, home appliance, radio and television, for use in decorative containers and for use as printed circuits.

It is an object of this invention to provide a simple process for the metallization of ceramics. It is also the object of this invention to provide a simple process for the metallization of ceramics which avoids the high temperatures required by the prior art processes. A further object of the present invention is to provide a process wherein the employment of controlled atmospheres can be avoided. These and other objects will become apparent to one skilled in the art from the following detailed description.

SUMMARY OF THE INVENTION

This invention relates to a process for the metallization of ceramics and to the products formed thereby. More particularly, this invention relates to a process which comprises applying to a ceramic substrate, a paste of ingredients comprising phosphorus sesquisulfide, a reducible metal salt and a volatile liquid, and heating the thus-treated substrate to a temperature sufficient to ignite the phosphorus sesquisulfide and to vaporize the liquid, and to the products formed by the foregoing process.

DESCRIPTION OF THE PREFERRED EMBODIMENTS

The process of this invention is applicable to ceramics which are solid bodies comprised essentially of inorganic nonmetallic materials usually present in a polycrystalline multiphase state. Thus, the term encompasses clays, porcelain, glasses, mica products, steatite, forsterite, cordierite, mullite, alumina, quartz, zircon, lithium aluminosilicates, beryllia, boron nitride, photosensitive glass ceramics, and the like. The ceramic substrates can be in various physical forms, such as shaped articles, for example, moldings, sheets, rods and the like.

In accordance with the preferred process of the invention, a paste containing phosphorus sesquisulfide, a reducible metal salt and a volatile solvent is applied to the ceramic substrate. The metals generally employed are those of Groups IB, IIB, IVB, VB, VIB, VIIB, and VIII of the Periodic Table. The preferred metals are copper, nickel, silver, gold, chromium, vanadium, tantalum, cadmium, tungsten, molybdenum, and the like. The metal salts that are used in the invention can contain a wide variety of anions. Suitable anions include the anions of mineral acids such as sulfate, chloride, bromide, iodide, fluoride, nitrate, phosphate, chlorate, perchlorate, borate, carbonate, cyanide and the like. Also useful are the anions of organic acids such as formate, acetate, citrate, butyrate, valerate, caproate, stearate, oleate, palmitate, dimethylglyoxime and the like. Generally, the anions of organic acids contain one to 18 carbon atoms.

Some useful metal salts include copper sulfate, copper chloride, silver nitrate, nickel chloride and nickel sulfate. Suitable volatile liquids employed in this invention include water; halogenated hydrocarbons and halocarbons such as chloroform, methylchloroform, phenylchloroform, dichloroethylene, trichloroethylene, perchloroethylene, trichloroethane, dichloropropane, ethyldibromide, ethylchlorobromide, propylenedibromide, monochlorobenzene, monochlorotoluene, and the like; aromatic hydrocarbons such as benzene, toluene, xylene, ethyl benzene, naphthalene and the like; ketones such as acetone, methyl ethyl ketone, and the like; acetic acid; acetic acid-trichloro-ethylene mixtures; carbon disulfide, and the like. Of these, water is the preferred volatile liquid.

The paste employed in this invention is prepared by mixing the phosphorus sesquisulfide, reducible metal salt and volatile liquid. The phosphorus sesquisulfide generally comprises about 0.25 to about 0.75 mole per mole of reducible metal salt, preferably about 0.45 to about 0.55 mole per mole of metal salt. The amount of volatile liquid employed will depend on the particular liquid used but, in general is kept low in order to facilitate good spreading over the ceramic surface. Preferably, a thickening agent is added to improve the covering properties of the paste. The thickening agent generally comprises about 0.5 to about 5 weight percent based on the weight of the volatile liquid, preferably about 1 to about 2 percent. The paste of this invention generally has a viscosity of about 500 to about 5,000 centipoises at 25° C. preferably about 1,000 to about 2,000 centipoises.

Suitable thickening agents include the cellulose ethers which are prepared by alkylating cellulose. Typical cellulose ethers include methyl cellulose, ethyl cellulose, butyl cellulose, propyl cellulose, phenol cellulose, halophenyl cellulose such as chlorophenyl cellulose and bromophenyl cellulose, naphthyl cellulose, benzyl cellulose, carboxymethyl cellulose, hydroxyethyl cellulose, hydroxypropylmethyl cellulose, ethylhydroxyethyl cellulose, carboxymethylhydroxyethyl cellulose, carboxyhydroxyethyl cellulose, cyanoethyl cellulose and the like. Vinyl polymers and copolymers can also be employed as the thickening agent. Representative compounds include poly(vinyl chloride); poly(vinylidine chloride); poly(vinyl alcohol; poly(vinyl acetate); poly(vinyl acetals) such as poly(vinyl butyral) and the like; poly(vinyl ketals) such as those derived from cyclohexanone; poly(vinyl ethers) such as poly(methyl ether) and the like; poly(vinyl aldehydes and ketones) such as poly(methyl vinyl ketone), acrolein(acrylic aldehyde) and the like. Copolymers of the foregoing vinyl polymers can also be employed.

Polyglycols can also be employed as the thickening agent. The polyglycols are prepared from glycols. For example, polyethylene oxide and polypropylene oxide are prepared from ethylene glycol and propylene glycol respectively. Typical glycols include ethylene glycol, diethylene glycol, triethylene glycol, tetraethylene glycol, propylene glycol, 2-methyl-2-ethyl-1,3-propanediol, 1,5-pentanediol, 1,3-butylene glycol, neopentyl glycol, ethylene glycol monomethyl ether, diethylene glycol monomethyl ether, and the like.

The paste of this invention is coated on the ceramic substrate in a thickness sufficient to cover the desired portions of the substrate. Generally, the applied paste is about 1 to about 10 mils thick, preferably about 2 to about 5 mils. The resulting coated substrate is thereafter heated to a temperature at which the volatile solvent is driven off and the phosphorus sesquisulfide ignites. The minimum temperature required will vary depending upon the composition of the paste, however, generally a temperature of about 110° to 120° C. is sufficient. Although not necessary, any higher temperature which will not cause deterioration of the article can be employed. If it is desired to form a printed circuit on the ceramic substrate, the paste can be applied in the pattern desired and then heated as described hereinbefore. As the result of the phosphorus sesquisulfide ignition, a metal-phosphorus-sulfur compound is adherently bound to the ceramic substrate. By the term "-metal-phosphorus-sulfur compound" is meant the metal-phosphorus-sulfur coating which is formed on the surface of the substrate. Without being limited to theory, the metalphosphorus-sulfur compound may be an ionic compound or a solution (alloy).

The treated substrates that result from the heating of the coated ceramic substrates can, if desired, be subjected to a process that has become known in the art as electroless plating of chemical plating. In a typical electroless plating process, a catalytic surface is contacted with a solution of a metal salt under conditions in which the metallic ion of the metal salt is reduced to the metallic state and deposited on a catalytic surface. A suitable chemical treating bath for the deposition of a nickel coating on the catalytic surface produced in accordance with the process of this invention can comprise, for example, a solution of a nickel salt in an aqueous hypophosphite solution. Suitable hypophosphites include the alkali metal hypophosphites such as sodium hypophosphite and potassium hypophosphite and the alkaline earth metal hypophosphites such as calcium hypophosphite and barium hypophosphite. Other suitable metal salts for use in the chemical treating bath include metal salts described hereinbefore with respect to the composition of the paste. Other reducing media include formaldehyde, hydroquinone and hydracine. Other agents, such as buffering agents, complexing agents, and other additives are included in the chemical plating baths or solutions.

The treated substrates of the invention can be electroplated by processes known in the art. The article is generally as the cathode. The metal desired to be plated is generally dissolved in an aqueous plating bath although other media can be employed. Generally, a soluble metal anode of the metal to be plated can be employed. In some instances, however, a carbon anode or other inert anode is used. Suitable metals, solutions and conditions for electroplating are described in Metal Finishing Guidebook Directory for 1967, published by Metals and Plastics Publications, Inc., Westwood, N.J.

The following examples serve to illustrate the invention but are not intended to limit it. Unless specified otherwise, in this specification and claims, all temperatures are in degrees centigrade and parts are understood to be expressed in parts by weight.

EXAMPLE 1

Equal weights of phosphorus sesquisulfide and nickel acetate were mixed together with a small quantity of water to form an intimate paste. A thin layer of the paste was thereafter spread over a glass dish which was warmed gently to 120° C. on a hot plate. First, the water evaporated, then the paste began to smoke and finally ignited. The resulting black film on the glass plate was found to be conductive.

EXAMPLE 2

Equal weights of phosphorus sesquisulfide and nickel acetate were mixed together into a thick paste made with water containing 2 percent by weight of hydroxyethyl cellulose. The paste was applied in a continuous pattern of a printed circuit on the surface of a glass substrate. The glass was heated to about 120° C. at which temperature the water evaporated and the paste ignited. The resulting substrate had a black film over the areas covered by the paste, i.e. the continuous pattern, and the black film was found to be conductive.

EXAMPLE 3

Phosphorus sesquisulfide (1.1 grams, 0.005 mole) and cuprous chloride (1 gram, 0.01 mole) were mixed with 2 grams of water, thickened by the addition of 2 weight percent of the polyethylene oxide. The paste was spread evenly on a porcelain plate and heated to about 120° C. The water evaporated; the paste blackened and then ignited. The resulting black film on the porcelain was adherent and conductive. The thus-treated plate was electroless copper plated by immersion for 15 minutes at room temperature in a bath prepared by mixing 15 grams of copper nitrate, 10 grams of sodium bicarbonate, 30 grams of Rochelle salt, 20 grams of sodium hydroxide, 10 milliliters of 37 percent formaldehyde and sufficient water to provide a liter of solution. The resulting article had an adherent electroless conductive coating on the copper-phosphorus-sulfur compound. Thereafter, the article was electroplated, employing the article as the cathode, with about 0.3 mil of semibright nickel in a Udylite N–2E Semibright Nickel plating solution at a current density of 50 amperes per square foot, followed by about 1.7 mils of bright acid copper in a UBAC 01 plating solution (Udylite Corp.) at a current density of 50 amperes per square foot.

EXAMPLES 4–9

The procedure of example 1 is repeated except that the following metal salts are substituted for the cuprous chloride:

| Example | Metal Salt |
| --- | --- |
| 4 | nickel chloride |
| 5 | nickel sulfate |
| 6 | silver nitrate |
| 7 | copper pyrophosphate |
| 8 | cobalt chloride |
| 9 | ion chloride |

In each example a conductive, adherent metal-phosphorus-sulfur compound is formed on the substrate.

EXAMPLES 10–12

The procedure of example 2 c is repeated except that the following thickening agents are employed.

| Example | Thickening Agent |
| --- | --- |
| 10 | ethyl cellulose |
| 11 | poly (vinyl alcohol) |
| 12 | polypropylene oxide |

EXAMPLES 13–16

Example 3 is repeated but substituting the volatile liquids below for the water:

| Example | Volatile Liquid |
| --- | --- |
| 13 | methylene chloride |
| 14 | carbon tetrachloride |
| 15 | benzene |
| 16 | trichloroethylene-perchlorethylene mixture |

EXAMPLE 17

A paste was prepared by mixing equal weights of phosphorus sesquisulfide and nickel acetate with a small quantity of water containing 2 percent polyethylene oxide. The paste was uniformly spread on a porcelain plate and the resulting article was heated to 120° C. to produce an adherent nickel-phosphorus-sulfur compound on the porcelain. The thus-treated substrate was electroplated as follows: about 0.3 mil of semibright nickel was plated on the article in a Udylite 2–NE Semibright Nickel plating solution at 50 amperes per square foot current density followed by about 1.7 mils of bright acid copper in a UBAC 01 plating solution (Udylite Corp.) at a current density of 50 amperes per square foot.

Various changes and modifications can be made in the process and products of this invention without departing from the spirit and the scope of this invention. The various embodiments of the invention disclosed herein serve to further illustrate the invention but are not intended to limit it.

We claim:

1. A process which comprises applying to a ceramic substrate, a paste of ingredients comprising phosphorus sesquisulfide, a reducible metal salt and a volatile solvent, and thereafter heating the thus-treated substrate to a temperature sufficient to ignite the phosphorus sesquisulfide, wherein the metal is selected from groups IB, IIB, IVB, VB, VIB, VIIB, and VIII of the Periodic Table.

2. The process of claim 1 where the substrate is heated to a temperature of at least 110° C.

3. The process of claim 2 wherein the volatile solvent is water.

4. The process of claim 3 wherein the paste additionally contains a thickening agent.

5. The process of claim 4 wherein the thickening agent is hydroxyethyl cellulose.

6. The process of claim 4 wherein the thickening agent is polyethylene oxide.

7. The process of claim 1 wherein the paste is applied to the ceramic substrate in a pattern.

8. An article comprising a ceramic substrate having thereon a conductive coating produced by the process of claim 7.

9. A process wherein the substrate resulting from the process of claim 1 is subjected to electroless plating to deposit an electroless conductive coating on the treated substrate.

10. An article comprising a ceramic substrate having thereon a conductive coating produced by the process of claim 9.

11. A process wherein the treated substrate resulting from the process of claim 9 is electroplated to deposit an adherent metal coating on the electroless conductive coating.

12. An article comprising a ceramic substrate having thereon a conductive coating produced by the process of claim 11.

13. A process wherein the substrate resulting from the process of claim 1 is electroplated to deposit an adherent metal coating on the treated substrate.

14. An article comprising a ceramic substrate having thereon a conductive coating produced by the process of claim 13.

15. An article comprising a ceramic substrate having thereon a conductive coating produced by the process of claim 1.